US012753720B2

(12) United States Patent
Papin

(10) Patent No.: US 12,753,720 B2
(45) Date of Patent: Oct. 6, 2026

(54) NOISE REDUCING DEVICE HAVING AN OBLIQUELY PIERCED HONEYCOMB STRUCTURE

(71) Applicant: SAFRAN AIRCRAFT ENGINES, Paris (FR)

(72) Inventor: Thierry Georges Paul Papin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 714 days.

(21) Appl. No.: 17/423,633

(22) PCT Filed: Jan. 22, 2020

(86) PCT No.: PCT/FR2020/050078
§ 371 (c)(1),
(2) Date: Jul. 16, 2021

(87) PCT Pub. No.: WO2020/152418
PCT Pub. Date: Jul. 30, 2020

(65) Prior Publication Data
US 2022/0099022 A1 Mar. 31, 2022

(30) Foreign Application Priority Data
Jan. 22, 2019 (FR) ....................................... 1900548

(51) Int. Cl.
*F02C 7/045* (2006.01)

(52) U.S. Cl.
CPC ........ *F02C 7/045* (2013.01); *F05D 2250/283* (2013.01); *F05D 2250/314* (2013.01); *F05D 2260/963* (2013.01)

(58) Field of Classification Search
CPC ....... B32B 3/12; B23C 2228/25; B21D 47/00; F02C 7/045; F02K 1/827; F05D 2250/283;
(Continued)

(56) References Cited

U.S. PATENT DOCUMENTS 3,850,261 A 11/1974 Hehmann et al.
3,867,240 A * 2/1975 Doerfling .................. B32B 7/12 428/80

(Continued)

FOREIGN PATENT DOCUMENTS

FR 2220079 A1 9/1974
FR 2938014 A1 * 5/2010 ............. B64D 15/04
FR 3012067 A1 4/2015

OTHER PUBLICATIONS

Machine Translation of FR 2938014 A1. Inventor Vauchel, Guy. Title: Sound Attenuation Panel for Aircraft Engine Nacelle. (Year: 2010).*

(Continued)

*Primary Examiner* — Dedei K Hammond
*Assistant Examiner* — Jennifer B Olson
(74) *Attorney, Agent, or Firm* — WOMBLE BOND DICKINSON (US) LLP

(57) ABSTRACT

A noise reducing device for an aircraft turbine engine, the device having a structure in the form of a stack of layers, such that a first and a second skin made of composite material form a first and a second outer layer, these outer layers being substantially parallel to one another and enclosing a central layer. The central layer has a honeycomb structure having partitions extending transversely from the first outer layer to the second outer layer so as to form
(Continued)

cavities. The partitions are made of viscoelastic material and form an acute angle of inclination (α) with the first and second outer layers.

8 Claims, 2 Drawing Sheets

(58) Field of Classification Search
CPC ........... F05D 2250/29; F05D 2250/314; F05D 2260/963; F05D 2300/612; Y02T 50/60
USPC .......................................... 181/213, 292, 288
See application file for complete search history.

(56) References Cited

U.S. PATENT DOCUMENTS 4,113,053 A * 9/1978 Matsumoto ........... E01F 8/0076 181/284
9,283,895 B2 * 3/2016 Sumi ......................... B32B 5/18
10,332,501 B2 * 6/2019 Lin ........................... B32B 7/12
2008/0075917 A1 * 3/2008 Park ..................... B29D 24/005 264/630
2014/0272311 A1 * 9/2014 Schwartau ............. B32B 27/36 156/196
2019/0039745 A1 * 2/2019 Haile ........................ B64C 1/40

OTHER PUBLICATIONS

Spradling, Drew M. and Guth, R. Andrew. "Carbon Foams". Advance Materials & Processes, Nov. 2003, pp. 29-31. (Year: 2003).*
International Search Report and Written Opinion received for PCT Patent Application No. PCT/FR2020/050078, mailed on May 25, 2020, 14 pages (6 pages of English Translation and 8 pages of Original Document).

* cited by examiner

NOISE REDUCING DEVICE HAVING AN OBLIQUELY PIERCED HONEYCOMB STRUCTURE

TECHNICAL FIELD OF THE INVENTION

The present invention relates to the field of the noise reducing in an aircraft engine.

BACKGROUND

The gas turbine engines, such as those powering the aircrafts, typically comprise structures for suppressing the noise, in particular the fan noise. These structures are generally composed of a plurality of cellular structures formed by partitions defining cavities. These cells are often arranged in a network, such as a network resembling a plurality of "honeycomb" cells.

These structures are typically located in the nacelle of the engine, downstream of the fan.

In the scope of the development of thin and short nacelles, the surfaces available for a possible acoustic treatment are becoming increasingly smaller. This means that there is less and less space to install the equipment, in particular the acoustic panels used to attenuate the noise of the fan. Thus, the volume and the integration of the equipment become major issues, in particular the installation of acoustic panels in the secondary duct of the engine.

Technically, in order to make an effective acoustic insulation, the implementation must respect the so-called "mass/spring/mass" principle: two masses are separated by a spring, for example a blade and an insulator. The spring between the two masses attenuates the energy of the sound and is thus used as a noise damper.

The present invention aims in particular at providing an acoustic treatment equipment allowing to reduce the thickness of the acoustic panels while maintaining the same efficiency.

SUMMARY OF THE INVENTION

This is made, in accordance with the invention, by means of a noise reducing device for an aircraft turbine engine, this device having a structure in the form of a stack of layers, such that a first and a second skin made of composite material form a first and a second outer layers, the first and second outer layers being substantially parallel to one another, the first and second outer layers enclosing a central layer having a honeycomb structure comprising partitions extending transversely from the first outer layer to the second outer layer, so as to form cavities. This device is characterized in that the partitions of the honeycomb structure of the central layer are made of viscoelastic material, and in that said partitions form, with the first and second outer layers, an acute angle of inclination, for example comprised between 10 degrees and 80 degrees.

Thus, the thickness of the acoustic panels is reduced while maintaining the same efficiency. By reducing the thickness of the acoustic panels, the diameters of the casings are reduced. The reduction of these diameters allows to reduce the diameter of the nacelle as a whole. All of these diameter reductions allow an overall weight saving for the entire engine.

The device according to the invention may comprise one or more of the following characteristics, taken alone or in combination with each other:

- the partitions of the central layer are flat and all have the same angle of inclination with the first and the second outer layers, this angle of inclination being comprised between 10 degrees and 50 degrees, being for example an acute angle between 10 degrees and 30 degrees,
- the viscoelastic material is an organic foam,
- the viscoelastic material is a metallic foam,
- each partition of the central layer has a thickness comprised between 3 and 7 mm, preferably 5 mm,
- the central layer has a thickness comprised between 20 and 30 mm, and preferably 25 mm,
- the cavities of the central layer have a depth of 40 mm.

The invention also relates to an outer fan module casing comprising a device as defined above, for example, intended to be arranged immediately upstream or immediately downstream of the fan, considering the upstream and the downstream with respect to the air flow passing through a turbine engine provided with a fan.

The invention also relates to a method for manufacturing a device according to any of the preceding claims, characterized in that it comprises a step in which the cavities are made in the central layer by piercing a solid panel of viscoelastic material.

The method according to the invention may comprise one or more of the following characteristics, taken alone or in combination with each other:

- the panel made of viscoelastic material has two surfaces substantially parallel to one another, the piercing being made obliquely, so that each cavity has a height forming part of a plane which is not perpendicular to the surfaces of the panel.

The method further comprises the following steps:

- fixing a first skin made of composite material to a first surface of the pierced viscoelastic material panel,
- fixing a second skin made of composite material to a second surface of the pierced viscoelastic material panel, and
- making perforation in the first skin made of composite material.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

Figure 1:
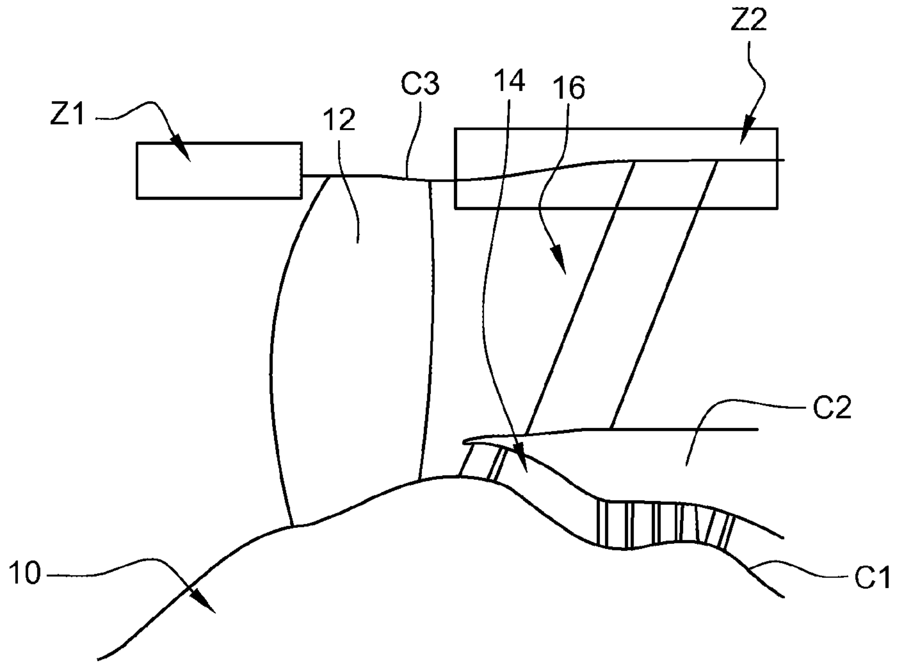
FIG. 1 is a schematic and axial cross-sectional view of an aircraft engine inlet, illustrating the acoustic treatment areas.

FIG. 1 shows schematically a cross-section of inlet aircraft turbine engine comprising, classically, a gas generator 10 surrounded by an inner casing C1, a fan 12, a primary duct 14 and a secondary duct 16 separated by an intermediate casing C2. The primary duct 14 is thus delimited by the inner casing C1 and the intermediate casing C2. The secondary duct 16 is delimited by the intermediate casing C2 and a fan module outer casing C3. This outer casing C3 is part of the components of the nacelle of the aircraft. The casing C3 at least partially surrounds the fan 12.

As shown in FIG. 1, the outer casing C3 comprises two acoustic treatment areas Z1, Z2. The first acoustic treatment area Z1 is located upstream of the fan. The second acoustic treatment area Z2 is located downstream of the fan 12. The upstream and the downstream are defined in the present application according to the flow direction of the gas in the turbine engine.

Figure 2:
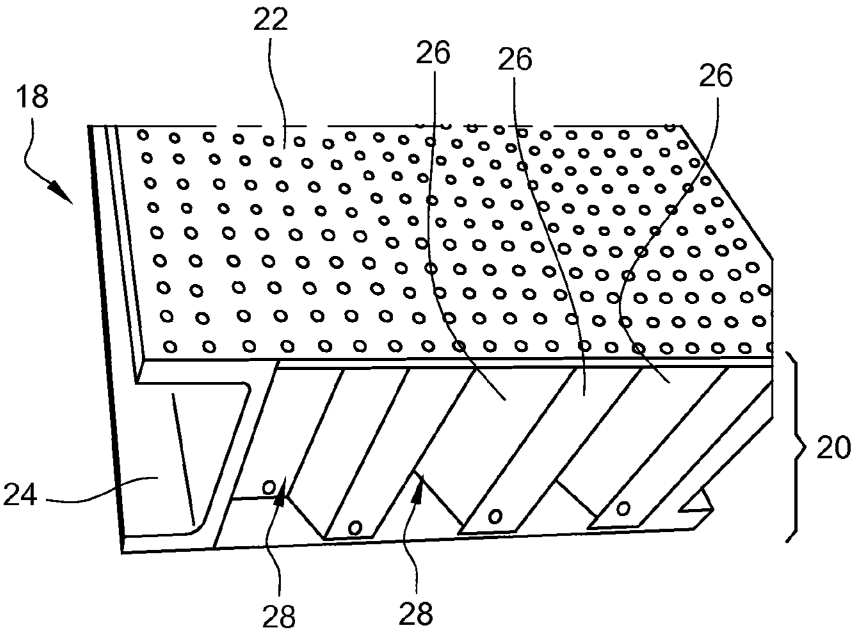
FIG. 2 is a perspective view of an example of a noise reducing device comprising a honeycomb central layer according to the prior art.

An acoustic treatment area Z1, Z2 mainly comprises an acoustic panel forming a noise reducing device 18 (see FIG. 2). This device 18 typically has a structure in the form of a stack of layers 20, 22, 24.

The main criteria allowing an optimal acoustic treatment are the surface area and the distance travelled by the sound wave to be attenuated in a cavity.

The targeted frequency range extends typically from 400 to 4 KHz for an engine of the "Ultra High By Pass Ratio" (UHBR) type typically used by the applicant.

As illustrated in FIG. 2, the noise reducing device 18 according to the invention comprises a central layer 20 forming core. This central layer 20 forms a so-called honeycomb structure. This central layer 20 typically has a thickness E of about fifty millimeters. It is usually made of foam-type material (organic or metallic) or other viscoelastic material. Said central layer 20 is, as seen in FIG. 2, sandwiched between a first and a second skin 22, 24 made of carbon or glass composite material. These two skins 22, 24 form a first and a second outer layers 22, 24 of the device 18 respectively. The first and second outer layers 22, 24 are substantially parallel to one another and enclose the central layer 20. The honeycomb structure of the central layer 20 is made by means of planar partitions 26, all substantially parallel to one another, extending transversely from the first outer layer 22 to the second outer layer 24. These flat partitions 26 are positioned in contact with each other, via their edges, so as to form, with the two skins 22, 24, homogeneous cavities 28.

The device 18 being integrated into the nacelle of the aircraft, the first outer layer (inner skin) 22 is in contact with the air flowing inside the secondary duct 16 and the second outer layer (outer skin) 24 is in contact with the air circulating around the nacelle.

In order to associate the desired acoustic function (reduction of noise) with the device 18 and to allow the air circulating in the secondary duct 16 to penetrate the central layer 20, perforations are made in the inner skin 22. These openings typically have a diameter D of 5 mm.

In order to obtain good acoustic performance, it is conventional to opt for a perforation rate of the inner skin 22 comprised between 5 and 12%. This rate is preferably in the order of 10%. The air is thus driven into the central layer 20 and the sound produced is reduced. Indeed, the partitions 26 form the cavities 28 called resonant cavities. Under the effect of the passage of the air, the partitions 26 of said cavities 28 vibrate and, if the dimensions are well calculated, enter into resonance.

The frequency tuning, i.e. the optimization which allows to reach a maximum dissipation of the frequencies to be attenuated, is done mainly by modulation of the volume of the resonant cavities 28. The geometric characteristics of the partitions 26 are therefore defined according to the targeted acoustic performance.

Figure 3:
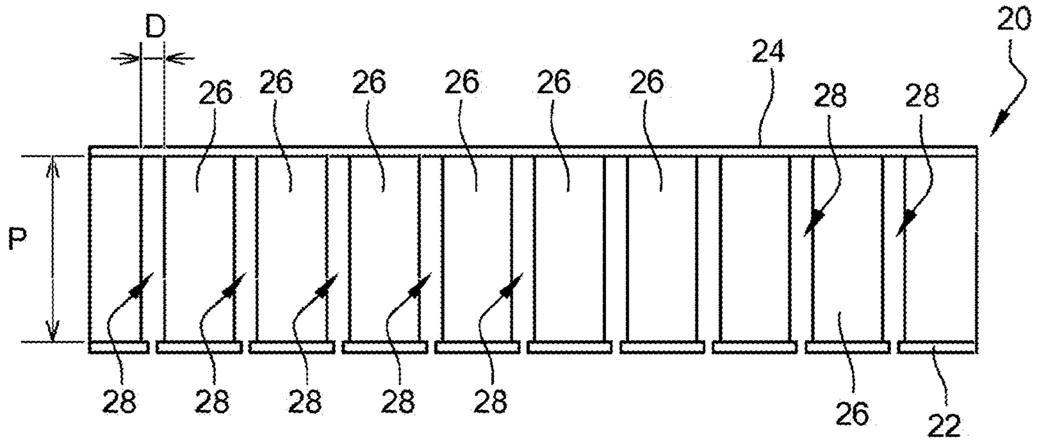
Fig. 3 (PRIOR ART)
FIG. 3 is a schematic cross-sectional view of a honeycomb structure according to the prior art.

Classically, in the prior art, the cavities 28 have a depth P of the order of 40 mm for the targeted application, as seen in FIG. 3. The depth P is defined in the present application as the length of a partition 26, i.e. the distance separating the two outer layers 22, 24 of the device 18 along an axis substantially parallel to said partitions 26. In the prior art (see FIG. 3), these planar partitions 26 extend perpendicularly between the inner and outer skins 22, 24. The depth P of the cavities 28 thus merges with the height of the device 18, as seen in FIGS. 2 and 4.

The invention proposes to reduce the thickness of the acoustic treatment areas Z1, Z2. As seen in FIG. 4, the partitions 26 do not extend transversely between the first and second outer layers 22, 24. The partitions 26 do not extend perpendicularly between the first and second outer layers 22, 24. In particular, the partitions 26 form an acute angle of inclination α with the outer layers 22, 24.

Figure 4:
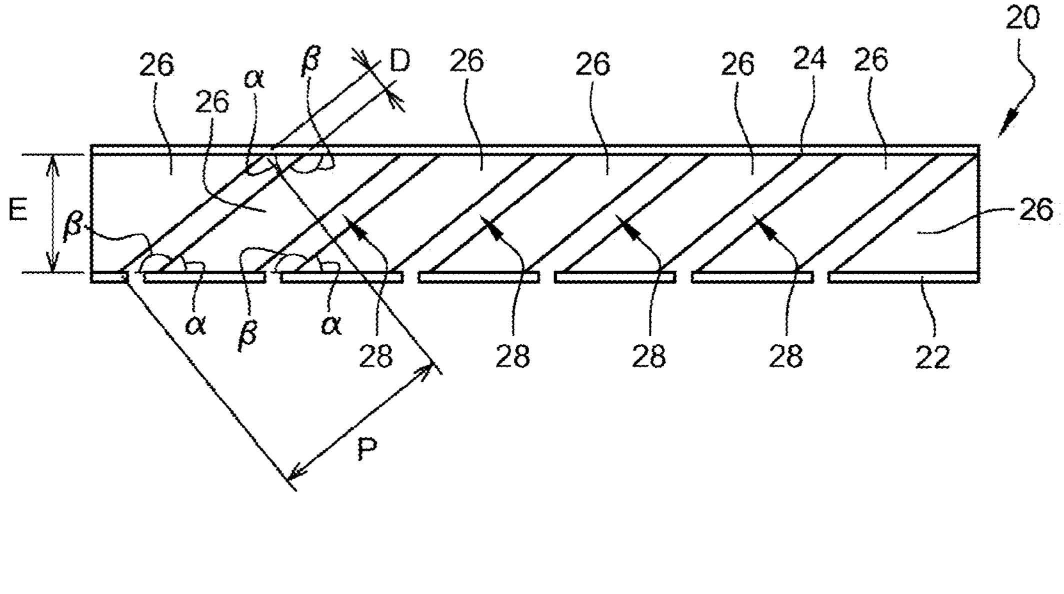
FIG. 4 is a schematic cross-sectional view of a honeycomb structure according to the present invention.

It is apparent that any acute angle α between the first face of the partition 26 and the outer layers 22, 24 implies the presence of an obtuse angle β between the second face of the partition 26 and the outer layers 22, 24, as visible in FIG. 4.

The partitions 26 of the central layer 20 thus all have the same angle of inclination α with the first and the second outer layers 22, 24. This angle of inclination α is acute, for example being comprised between 10 degrees and 80 degrees. Good results are obtained by considering, for example, an acute angle between 10 degrees and 50 degrees. The angle values closer to 10 degrees than 50 degrees are preferred.

Each partition 26 of the central layer 20 has a thickness comprised between 3 and 7 mm, and preferably 5 mm. As seen in FIG. 4, the central layer 20 has a thickness E comprised between 20 and 30 mm, preferably 25 mm. However, since the partitions 26 no longer form a right angle with the skins 22, 24, the thickness E of the central layer 20 no longer merges with the depth P of the cavities 28. Indeed, the depth P of the cavities 28, i.e. the length of the partitions 26, is always substantially 40 mm. Thus, the acoustic characteristics of the device 18 have not been changed, although the overall height of the device 18 has been reduced by a factor of about 1.6. Thus, an equivalent reduction of noise is maintained in a reduced thickness E. This also allows to reduce the diameter of the outer casing C3 of the fan and thus the nacelle of the aircraft. The reduction in size of the nacelle of the aircraft allows to reduce the drag and the weight of said aircraft.

The honeycomb structure of the central layer 20 is made of viscoelastic material. This viscoelastic material can, for example, be an organic foam or a metallic foam.

This inclined honeycomb structure is obtained by means of a method applied to a solid panel of viscoelastic material (e.g. organic or metallic foam).

This solid panel has two surfaces that are substantially parallel to one another. The height of the solid panel is approximately 25 mm. The solid panel is intended to form the central layer 20.

The viscoelastic material may comprise a polymer. The polymer is for example a polyurethane, a polyester, a polyepoxyde, a polypropylene or a polymethacrylimide.

The viscoelastic foams (in particular polymeric) may resist (maintain their shapes) temperatures between 100° C. and 200° C. The elastic modulus may be between 70 Mpa and 200 Mpa (ISO 527-2).

The method here comprises five steps listed below:

making the cavities 28 of the central layer 20 by oblique piercing in the solid panel, fixing a first skin 22 made of composite material to the first surface of the pierced panel, fixing a second skin 24 made of composite material to the second surface of the pierced material panel, and making perforation in the first skin 22 made of composite material.

The piercing of the solid panel is obliquely made so that each cavity 28 has a height forming part of a plane which is not perpendicular to the surfaces of the panel.

The piercing step can be made by means of piercing barrels which can be used as a guide in order to respect the angle of inclination α chosen.

The depth P of the piercing made is based on the length equivalent to the performance of the expected application, in this case 40 mm.

Thus, with this method for piercing foam, the person skilled in the art has a very large degree of freedom in the choice of both the angle of inclination α and the length of the partitions 26. Indeed, once the acoustic model has been modelled, the piercing of the panel can be easily made with a satisfactory accuracy. The method according to the present invention allows to get rid of the difficulties related to the assembly of an inclined honeycomb structure. All that remains is to add the outer layers 22, 24 and to perforate the inner outer layer 22 and the device 18 is functional. Thus, in addition to the space saving due to the height of the panels, the weight saving due to the reduced diameter of the outer casing, the weight and drag saving of the aircraft due to the reduction of the outer surfaces of the nacelle, there is a time saving during the manufacturing of the device 18.

The invention claimed is:

1. A method for manufacturing a noise reducing device for an aircraft turbine engine, said device having a structure in the form of a stack of layers such that a first and a second skin made of composite material form a first and a second outer layers, the first and second outer layers being substantially parallel to one another, the first and second outer layers enclosing a central layer having a honeycomb structure comprising partitions extending transversely from the first outer layer to the second outer layer, so as to form cavities, wherein the partitions of the honeycomb structure of the central layer are made of viscoelastic material, and in that said partitions form, with the first and second outer layers, an acute angle of inclination (α), all the partitions of the central layer being parallel to each other wherein each partition of the central layer has a thickness comprised between 3 mm and 7 mm, wherein the central layer has a thickness comprised between 20 and 30 mm, and wherein the cavities of the central layer have a depth of 40 mm, and wherein the viscoelastic material of the partitions of the honeycomb structure of the central layer comprise a polymer, the polymer being a polypropylene or a polymethacrylimide, wherein the method comprises the following steps:

forming cavities in the central layer by piercing a solid panel of viscoelastic material which has two surfaces substantially parallel to one another, the piercings being made obliquely and all piercings being made parallel to each other, so that each cavity has a height forming part of a plane which is not perpendicular to the surfaces of the panel, fixing the first skin made of composite material to a first surface of the pierced viscoelastic material panel, fixing the second skin made of composite material to a second surface of the pierced viscoelastic material panel, and making perforation in the first skin made of composite material.

2. The method according to claim 1, wherein the partitions of the central layer are flat and all have the same angle of inclination (α) with the first and the second outer layers, this angle of inclination (α) being comprised between 10 degrees and 50 degrees.

3. The method according to claim 1, wherein each partition of the central layer has a thickness of 5 mm.

4. The method according to claim 1, wherein the central layer has a thickness of 25 mm.

5. The method according to claim 1, wherein the first outer layer has perforations, the perforation rate being between 5% and 12%.

6. The method according to claim 5, wherein the perforations have a diameter of 5 mm.

7. The method according to claim 1, wherein the viscoelastic material is a foam having an Elastic Modulus between 70 MPa and 200 MPa.

8. The method according to claim 1 wherein the piercing step is made by piercing barrels.

* * * * *